United States Patent Office 3,841,938
Patented Oct. 15, 1974

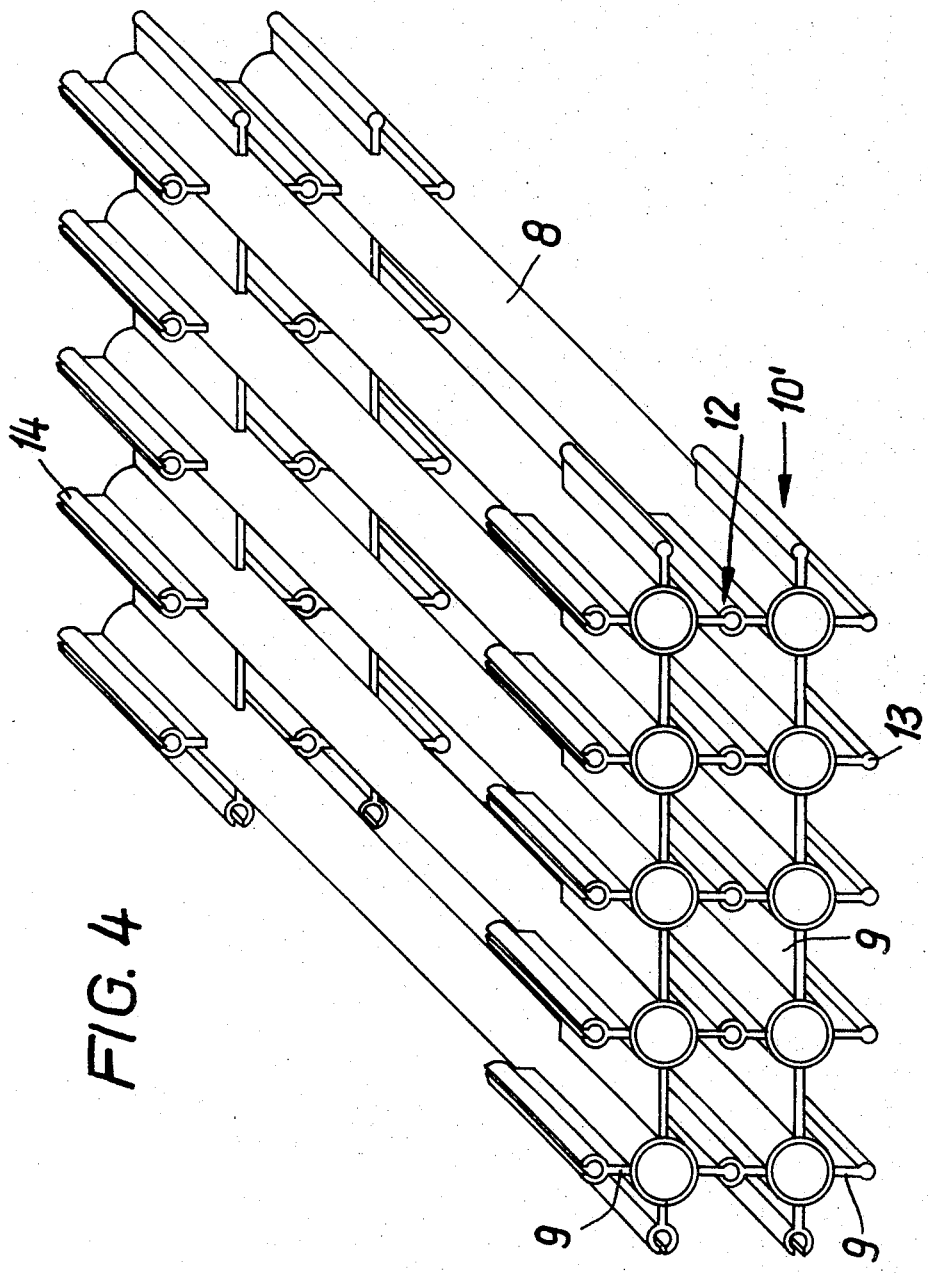

3,841,938
METHOD OF FORMING HEAT EXCHANGER
Werner Grosse-Holling, 50a Von-Moller-Strasse, D-4812 Brackwede, Germany; Jobst Hapke, 64 Tulpenweg, D-468 Wanne-Eickel, Germany; Wilhelm Hohenhinnebusch, 50 Zur Wollenbok, D-43 Essen-Heidhausen, Germany; and Helmut Schreiber, 67 Cranachstrasse, D-43 Essen, Germany
Filed Jan. 26, 1973, Ser. No. 326,751
Claims priority, application Germany, Jan. 29, 1972, P 22 04 167.4
Int. Cl. B32b 31/00; B29c 19/00
U.S. Cl. 156—293
2 Claims

ABSTRACT OF THE DISCLOSURE

A heat exchanger for cooling water and oil in vehicles which includes a distributing container, a collecting container, and a nest of tubes interconnecting the containers, according to which the two containers consist of extruded synthetic material. The tubes of the nest of tubes are very thin-walled tubes of synthetic material and have a relatively short diameter. Spacers and locators form one piece with the respective tubes and space and locate the tubes relative to each other. The tubes are welded to the tube conecting plates respectively forming part of the distributing and collecting container. The synthetic material is preferably selected from one of the groups of substances consisting of polyolefin temperature resistant up to approximately 110° C., polypropylene, polybutene and polyamide.

The present invention relates to heat exchangers for cooling water, motor oil, and/or transmission oil in vehicles, and more specifically, concerns a heat exchanger of the type involved which comprises a distribution container with an inlet connection, a collecting container with a return connection, and with passages or conduits aranged between said containers for conveying the medium to be cooled. These conduits or passages are swept by or passed around, i.e. are cooled by the wind encountered during the driving or by an airflow created by a fan.

The heat exchangers employed in particular in the automobile industry for cooling the circulating cooling water, the motor oil and/or the transmission oil are generally made of steel, copper, brass, or aluminum. These heat exchangers generally consist either of a plurality of narrowly finned pipes soldered at their ends to very thin-walled water boxes or they consist of a great number of pipes which are flattened in the direction of flow of the medium passing therethrough and between which there is soldered a compact packet of fins which greatly increases the heat exchanging surface and thereby compensates for the well-known poor heat exchange at the air side. The fins will, in view of a particular design, aid the turbulence and will also improve the heat exchange at the air side in this way.

The heretofore known heat exchangers of the type involved have, however, a number of drawbacks. In the first place, the employed sheet metal has to be very thin in order to save weight and their wall thickness may amount to only 0.15 mm. As a result thereof, the sheet metal parts are liable to be damaged by minor mechanical stresses, and a heat transfer surface can be destroyed, for instance, by the impact of a pebble. When subjected to higher loads, there exists the danger that the entire heat exchanger loses its fixed form. Finally, the very dense fin packet forms an actual soil collector.

A further important disadvantage of the heretofore known heat exchangers consists in the numerous required soldering areas. In order to keep the costs of manufacturing of such heat exchanger within economical limits, the soldering of the connecting areas is usually effected in an immersion bath. Although this soldering method has been considerably improved in the past, it is possible when making the heat exchangers by mass production, that faulty soldering may occur, or improper seams will form in the connections between the distributing container and the collecting container and their connections as well as between said containers and the pipes. In this connection a further disadvantage of the heretofore known heat exchangers may be mentioned, namely, that areas of the heat exchangers which show leaks can, as a rule, be soldered only under difficulties, inasmuch as they are frequently not accessible or accessible only under difficulties and such repair jobs might endanger adjacent areas.

In order to avoid the occurrence of undesired vibrations and the transfer of noise to the body of the vehicle, it is necessary that the heretofore known heat exchangers be anchored by the intervention of cushioning or dampening intermediate elements.

It is, therefore, an object of the present invention to provide a heat exchanger of the above mentioned general type which will overcome the above outlined drawbacks of hertofore known heat exchangers.

This object and other objects and advantages of the invention will appear more clearly from the following specification, in connection with the accompanying drawings, in which:

FIG. 1 diagrammatically illustrates an isometric view of an automobile cooler or radiator, only a portion of the nest of pipes being shown in the drawing in order to illustrate the matrix-like distribution of the pipes of synthetic material.

FIG. 4 shows an isometric view of two layers of pipes of synthetic material which are connected to each other at the fin-shaped ribs by means of jaw clutches so as to form a firm unit.

Figure 5:
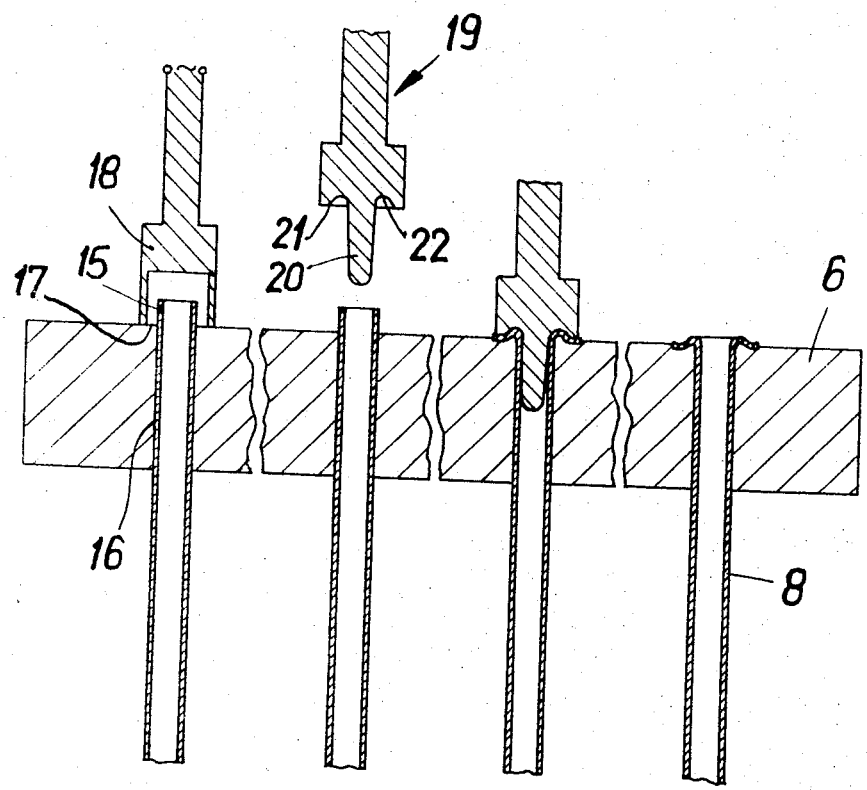

FIG. 5 diagrammatically illustrates the manufacture of the connection between the nest of tubes or pipes and the tube connecting plates according to a first method of the present invention.

Figure 6:
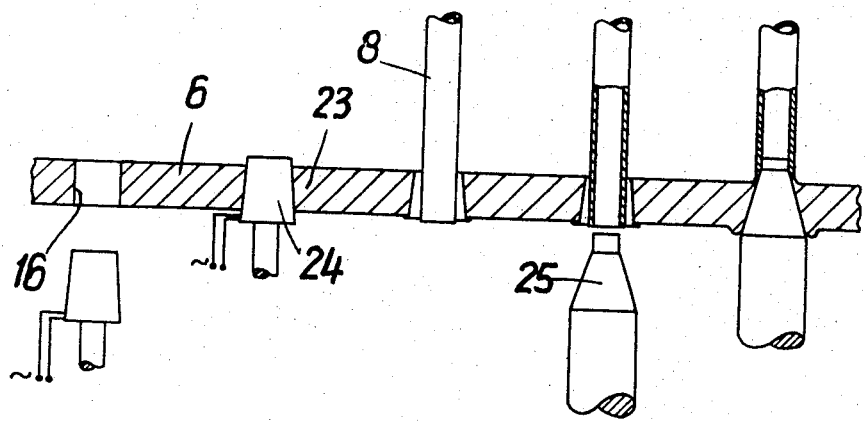

FIG. 6 diagrammatically illustrates the manufacture of the connection between the nest of tubes and the pipe connecting plates according to another method of the invention.

Figure 7:
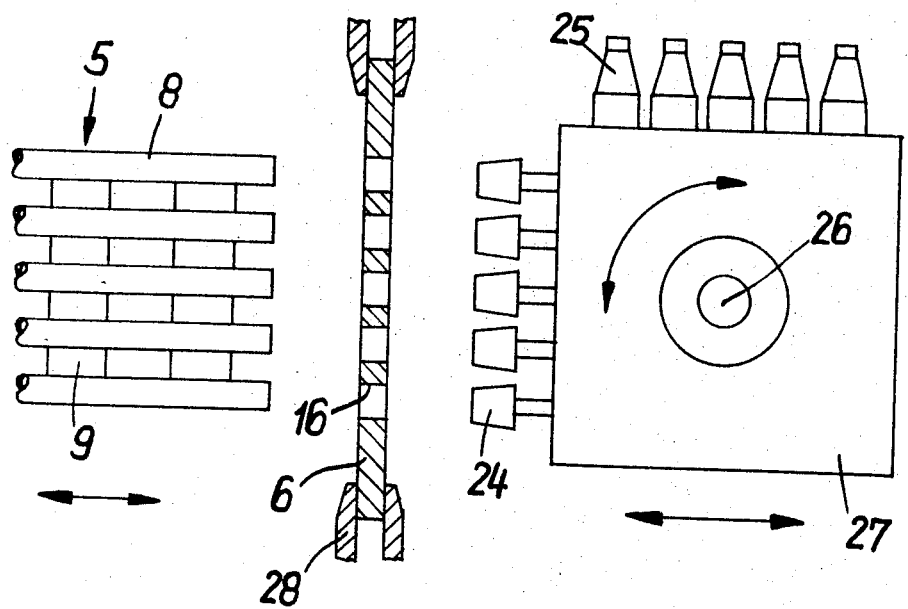

FIG. 7 diagrammatically illustrates an arrangement for a welding of the ends of the nest of tubes to the tube connecting plates in a mass producing operation.

FIGS. 8a-8f diagrammatically illustrates variations of a further manufacturing process according to the invention, according to which the pipe connecting plates are fused onto the pipe ends of the nest of tubes.

It has been found according to the present invention that the drawbacks of the heretofore known heat exchangers can be substantially avoided if synthetic material is employed for making the heat exchanger. The problem underlying the present invention has been solved by a heat exchanger according to the invention which is characterized primarily in that the two collecting containers together with the pertaining connections are designed as injection molded articles of synthetic material and that the passages or conduits are, in a manner known per se, produced in the form of a nest of tubes comprising a plurality of very thin-walled tubes of synthetic material with a short diameter, while space and position holding means form one piece with the tubes and are arranged between the tubes. The matrix-like distributed pipes have their ends received in pipe connecting plates of the collecting containers and at least within the region of the surface of the pipe connecting plates facing toward the interior of the container are welded to said pipe connecting plates.

According to one feature of the invention, it is advantageous as synthetic material for producing a heat exchanger of the invention to employ a polyolefin which is stable up to a temperature of 110° C. The polyolefin synthetic material emphasizes to a particular extent the advantages inherent to a heat exchanger according to the invention made of synthetic material, inasmuch as this synthetic material is characterized by a high temperature stability, low crawling tendency, high corrosion resistance, high sound and noise cushioning properties as well as by a low specific weight. The heat exchanger according to the present invention may be further improved by extruding the tubes of synthetic material individually or in groups of polypropylene, polybutene, or polyamide. In this way, the costs of production are further reduced. Furthermore, if desired, the tubes may without difficulties be produced in one piece with the spacers and position holders.

In conformity with the invention, the tubes of synthetic material are at four sides provided with radially extending fins which extend in sections in the longitudinal direction of the tubes. By means of these fins the tubes in the form of a nest of tubes are interconnected so as to form a unit. The finned tubes can without great costs be produced by extrusion. The advantage of the fin-shaped ribs consists in that they give the flexible tubes in the nest of tubes a certain permanently fixed position. In this way, the adjacent tubes will be prevented from engaging each other. This, in turn, brings about a maximum heat exchanging surface. As a result thereof, the uniform sweeping of the tubes through the cooling medium will be assured. In addition thereto, the fins increase the output of the heat exchanger inasmuch as they create a turbulence which intensifies the sweeping of the tubes by the cooling medium. According to a particularly advantageous design of the invention, the nest of tubes is, in conformity with the building block principle, composed of tube groups which form one piece with the fins. These groups of tubes are connected to each other at the adjacent fins by welding, cementing, or by a jaw clutch. Such groups of tubes may likewise be produced by extrusion. They permit the manufacture of nests of tubes at low costs. Furthermore, starting from a basic unit, they permit the manufacture of nests of tubes for heat exchangers of different sizes and outputs.

The present invention also comprises various methods of advantageously making heat exchangers according to the invention from synthetic material. More specifically, the methods according to the invention concern the connection of the tube ends of the manufactured nests of tubes to the tube connecting plates of the distributing and of the collecting container. Thus, one method according to the invention is characterized in that the tube ends of the manufactured nest of tubes is pre-bored tube connecting plates of the distributing container and of the collecting container in one working operation by welding in such a way that first the marginal region of the receiving bores are heated to welding temperature by slightly conical heating heads inserted into said receiving bores whereupon the tube ends are introduced into said bores from the opposite side and subsequently conical mandrels are introduced into the tube ends whereupon the tube outer walls are under pressure welded to the tube connecting plates. The employed conical mandrels have a smaller diameter than the inner diameter of the tubes while the largest diameter of said mandrels is greater than that of the pre-bored holes.

According to a particularly advantageous method according to the invention, the tube ends of the pre-manufactured nests of tubes are connected to the pre-bored tube connecting plates of the distributing container and of the collecting container in one working operation by welding in such a way that first the tube ends are inserted into the receiving bores so that they protrude to a certain extent whereupon the protrusions and the pertaining surface marginal areas of the receiving bores are, by means of pot-shaped heating elements heated to welding temperature. Thereafter, the protruding tube sections are, by means of post-forming mandrels, radially folded outwardly and are welded to the marginal surface region of the receiving bores. The said post-forming mandrels have a centering stud to be introduced into the respective tube end, and also have an annular shoulder with an annular depression which is steplessly rounded from said stud.

For carrying out the above mentioned two methods, a device may be employed which in conformity with the invention comprises a frame which is pivotable about an axis and is displaceable transversely with regard to the pivot axis. In conformity with the number of tube ends of the nest of tubes, and in conformity with the dimension and distribution of the tube ends of the nest of tubes, the frame is on one side provided with heating elements, and on the other side carries the post-forming mandrels for the welding operation. When employing this device, the container or tube connecting plate for the tubes is firmly chucked, and from one side the nest of tubes with the tube ends is introduced into the pre-bored receiving bores whereas from the other side by means of the device according to the invention, the heating elements and the post-forming mandrels are moved toward the connecting plate. By means of an adjustable control, this device can be made into an automatically operating system.

According to a further method of the invention for producing heat exchangers, it may also be advantageous to fuse the tube connecting plate to the tube ends of the previously manufactured nest of tubes by immersing the same into a correspondingly dimensioned melting bath. In this connection, in the container receiving the melt there may be provided auxiliary devices which prevent the melt from entering the tube ends and/or during the fusing of the tubes onto the tube connecting plate may bring about the formation of grooves connecting the tubes or may cause the formation of complete reversing chambers in the tube connecting plate.

Figure 1:
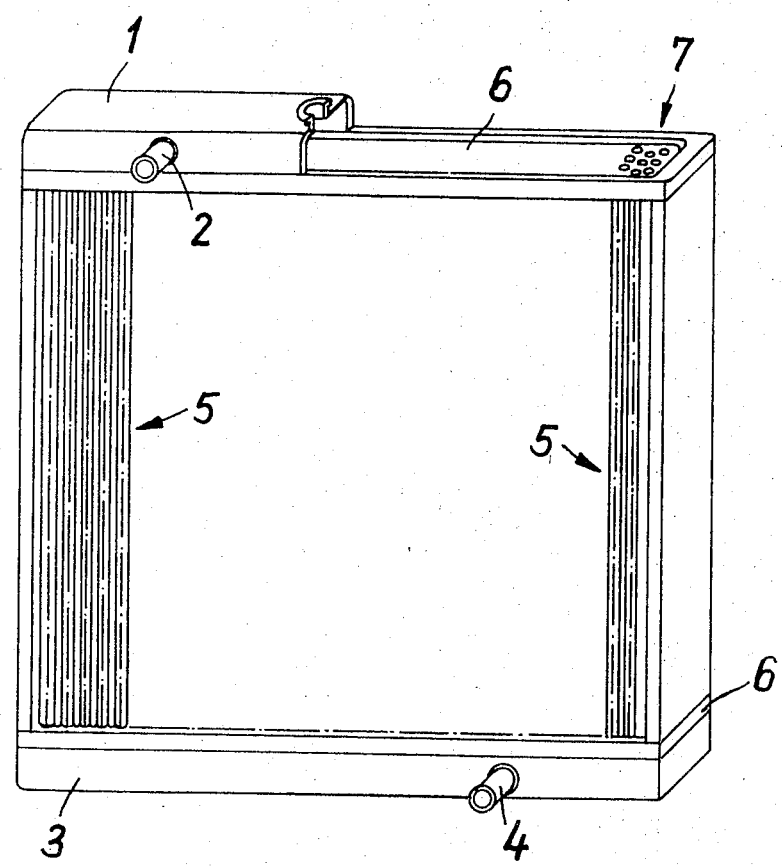

Referring now to the drawings in detail, the heat exchanger illustrated in FIG. 1 is made in conformity with the present invention of synthetic material and represents an automobile radiator for cooling the cooling water for the engine. This radiator comprises a distributing container 1 with an inlet connection 2, the collecting chamber 3 with the return connection 4, and the nest of tubes construction 5 arranged between the containers 1 and 3. The ends of said nest of tubes are, through tube connecting plates 6, connected to said containers 1 and 3. The water flowing down in the nest of tubes is cooled by an air current flowing transverse to the downwardly flowing water. This air current is generated by the driving wind and/or by a fan. According to a more detailed descrpition of the fundamentol idea of the present invention, the containers 1 and 3 together with the pertaining connections 2 and 4 are made of injection molded parts of synthetic material which can be produced at low prices in mass production. The nest of tubes construction comprises a plurality of very thin-walled tubes of synthetic material which have a small diameter. As indicated at 7, the tubes have a matrix-like shape. As a result thereof, a large heat exchanging surface is assured while the construction is compact, and furthermore a uniform sweeping of the pipes by the cooling medium will be assured. Between the pipes there are arranged spacing means and mounting holders which form one piece with the tubes but are not illustrated in FIG. 1. These spacing means and positioning or holding means form the nest of tubes into a firm unit and create turbulences by means of which the sweeping of the tubes by the cooling medium will be intensified. The tubes are together with their ends which are received by receiving bores provided in the tube connecting plates, welded to said tube connecting plates at least within the region of those surfaces of the tube connecting plates which face toward the interior of the container. As a result thereof, a tight connection is assured which is able to withstand high stresses. The heat exchanger is made preferably of a polyolefin synthetic material which is characterized in particular by high temperature resistance, high corrosion resistance, and a low specific weight.

Figure 2:
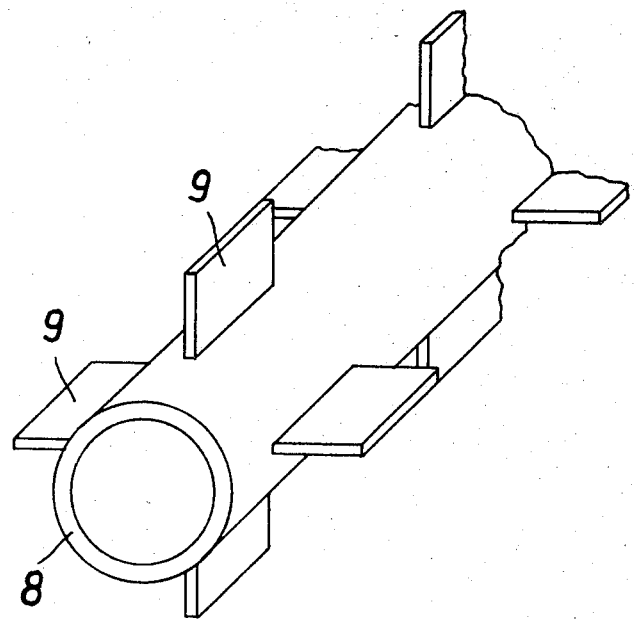
FIG. 2 is an isometric view on a highly enlarged scale of a pipe according to the invention which consists of synthetic material and is provided with fins.
Figure 3:
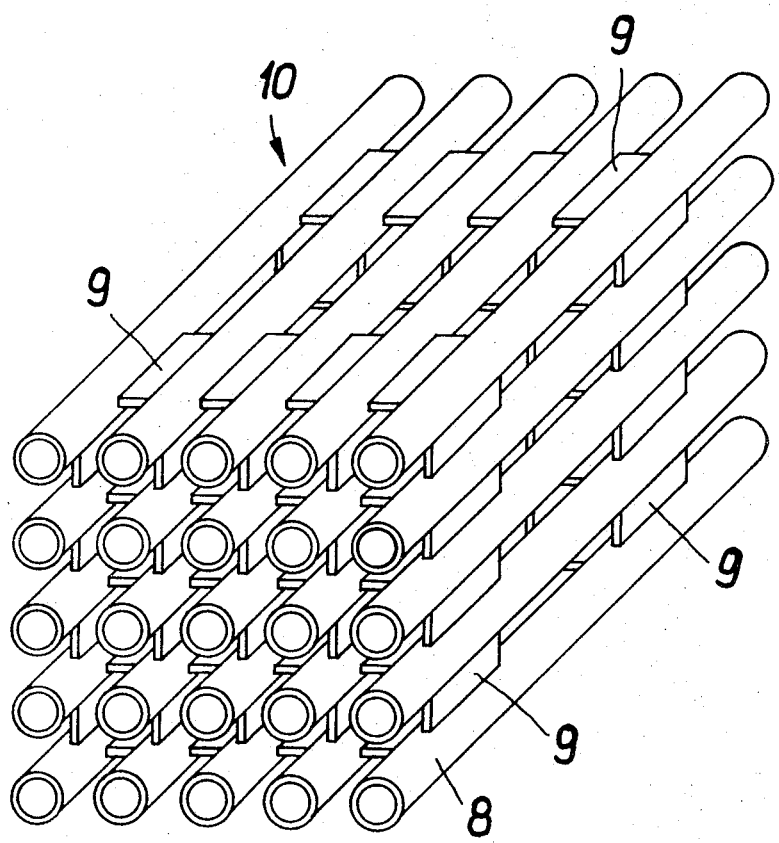
FIG. 3 is an isometric view of a group of pipes of synthetic material provided with fins.

FIGS. 2-4 illustrate details of the nest of tubes. As will be seen from the showing of FIG. 2 representing an individual tube 8, the tubes of synthetic material according to the present invention are on four sides provided with radially extending fins 9 which as sections extend in the longitudinal direction of the pipe. These fins are intended to interconnect the tubes of the nest of tubes so as to form a firm unit with each other in which each tube has a definite position and a definite distance relative to the adjacent tubes. The tubes are individually or in groups as a single piece with the fins extruded, and are preferably made of polypropylene, polybutene, or polyamide. By covering at intervals the pertaining slots of the nozzle, the fins can be produced in one working cycle with their individual sections. However, it is also possible to extrude the tubes first with continuous fins and subsequently to produce the said sections by milling, melting out, or punching out the fins.

For purposes of mass production at low cost, it is, however, advantageous to compose the nest of tubes in conformity with the building block principle from tube groups provided with fins forming one piece with the tubes, and to interconnect the tubes at the adjacent fins by welding, cementing, or by jaw clutch means. FIGS. 3 and 4 illustrate examples based on the just mentioned principle. According to FIG. 3, a tube group 10 which forms one or the entire nest of tubes construction, which consists of a plurality of tubes 8 and the fins 9 interconnecting the same is produced in one working cycle by extrusion. In this connection, the interruption or sections of the fins is either already during the extrusion process provided by a non-illustrated device covering the slots of the extrusion nozzle at certain intervals, or is produced by milling or melting out portions of the fins.

According to FIG. 4, so-called tube mats 10' are provided in the form of tube groups forming a single piece with the fins. These tube mats may be produced in one working operation by extrusion or as the case may be with subsequent milling or melting out of sections of the fins. The building block-like combining of a plurality of tube mats to form a larger nest of tubes construction is effected by means of the jaw clutches 12. To this end, the downwardly directed fins are at their ends provided with thickened portions 13 and the upwardly directed fins are provided with the jaw-shaped ends 14. The coupling may be effected by inserting the thickened portions 13 into the jaws 14 or by radially pressing in the thickened portions into the jaws.

By means of the tube groups 10, 10' it is possible to form nests of tubes of different sizes in conformity with the required size and output of the heat exchanger.

FIGS. 5 to 8 illustrate how it is possible to produce welding connections between the tube ends and the nest of tubes and the tube connecting plates by low cost mass production methods while such welding connections are adapted to withstand high loads. According to FIG. 5, the ends of the pipes 8 are up to a certain projection 15 (of, for instances, 5 mm.) inserted into the previously prepared receiving bores 16 of the pipe connecting plates 6. Subsequently the said tube projections and the pertaining surface marginal ranges 17 of the receiving bores are heated to welding temperature. Subsequently, the said tube projections are by means of post-shaping mandrels 19 which have a centering pin 20 leading into the tube end and an annular shoulder 21 steplessly rounded from the pin folded radially outwardly and are welded to the marginal surface area 17 of the receiving bores. Corresponding to the right-hand partial illustration, a firm definite connection is established.

In conformity with FIG. 6, the welding is carried out in a somewhat different way. First the marginal area 23 of the receiving bores 16 of the tube connecting plate 6 is heated to welding temperature by heating heads 14 which are introduced into the plate 6 and are slightly conical thereby making the respective bore 16 conical. Subsequently, the pipes 8 are inserted into the bores from the opposite side. Finally, the conical mandrels 25, the smallest diameter of which is less than the inner diameter of the pipe and the largest diameter of which is greater than that of the pre-drilled bores 16 are inserted into the tube ends, and the outer walls of the tube are under pressure welded to the connecting plate 6. It has been proved that the welding with a local heating by heating elements will, in contrast to the heating by a heating gas, result in considerably firmer connections which will safely assure the required density.

FIG. 7 diagrammatically indicates how the method according to FIGS. 5 and 6 can be practiced for mass production. A frame 27 is pivotally arranged about the axis 26 and is displaceable in a direction transverse to the pivot axis. In conformity with the number and distribution of the nest of tubes constructions 5, the heating elements 24 are arranged on one side whereas the post-forming mandrels 25 used for the welding operation are arranged on the other side. The tube connecting plate 6 is firmly chucked by means of the holding means 28. The frame 27 is moved toward the left in order to introduce the heating heads 24 into the bores 16. After a local heating, the frame returns to its previous positions and the nest of tubes construction 5 have their pipe ends from the left-hand side introduced into the bores 16. In the meantime, the frame is pivoted in counterclockwise direction by 90° so that by a new displacement of the frame toward the left, the post-forming mandrels 25 can be introduced into the pipe ends for welding the same to the tube receiving plate 6. By means of a non-illustrated variable control system, the device according to FIG. 7 can be converted easily to a fully automatic device. It is a matter of course that the frame according to FIG. 7 may also be equipped with pot-shaped heating elements 18 and with the post-forming mandrels 19 according to FIG. 5.

Figure 8A:
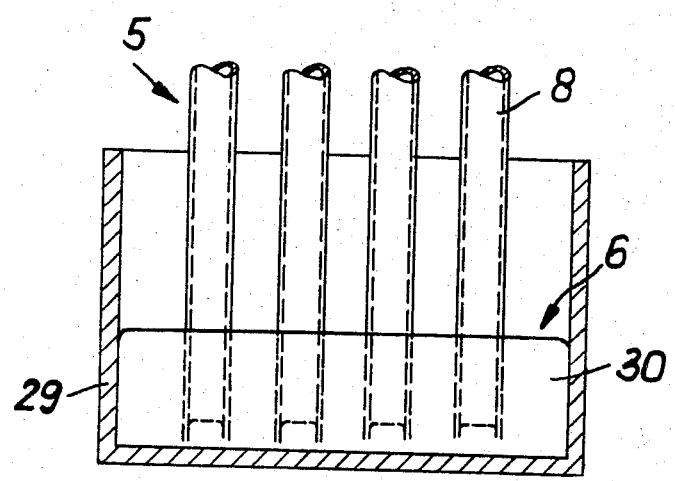
Figure 8B:
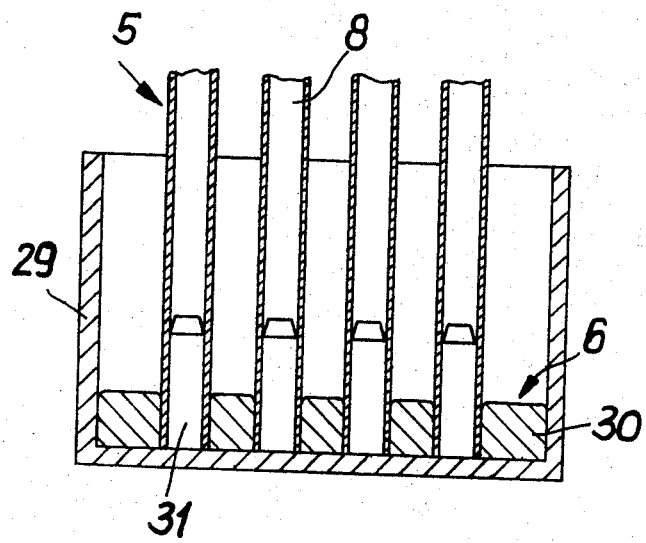
Figure 8C:
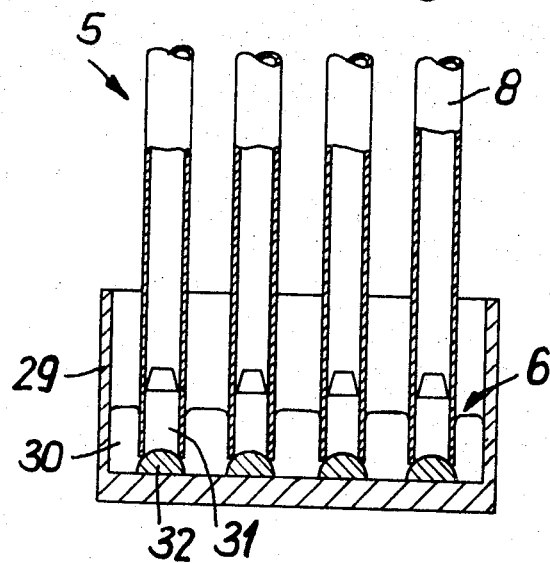
Figure 8D:
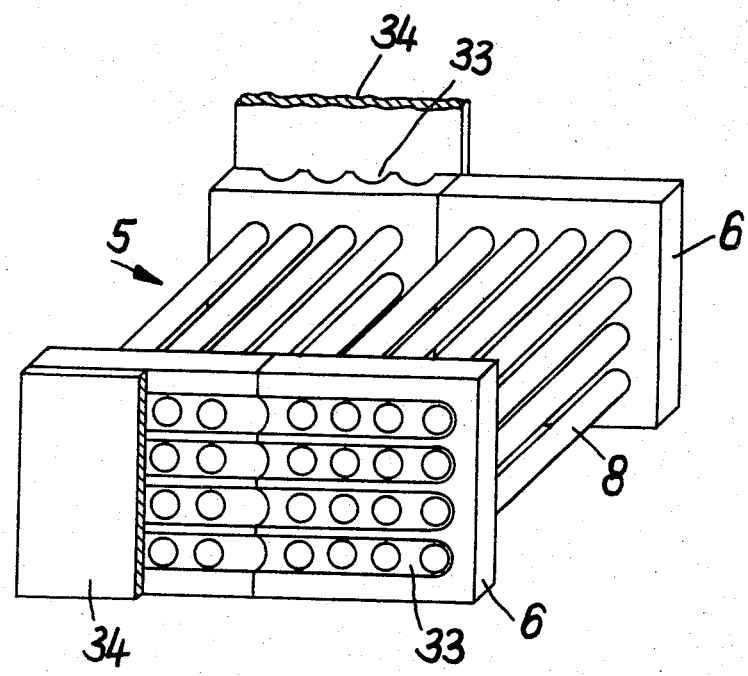
Figure 8E:
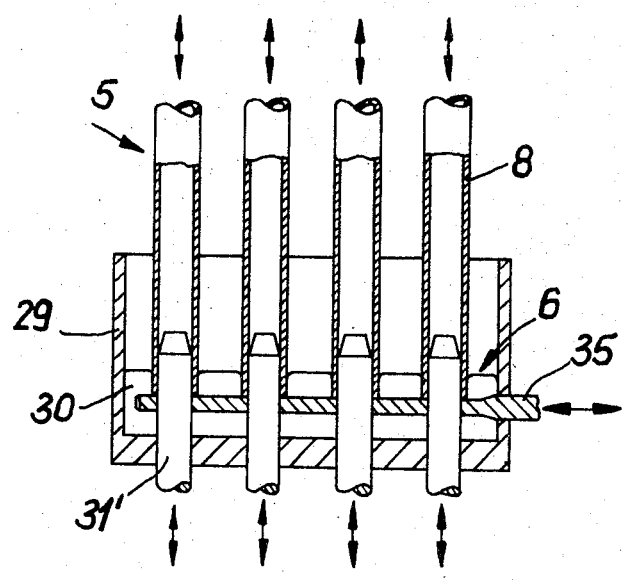
Figure 8F:
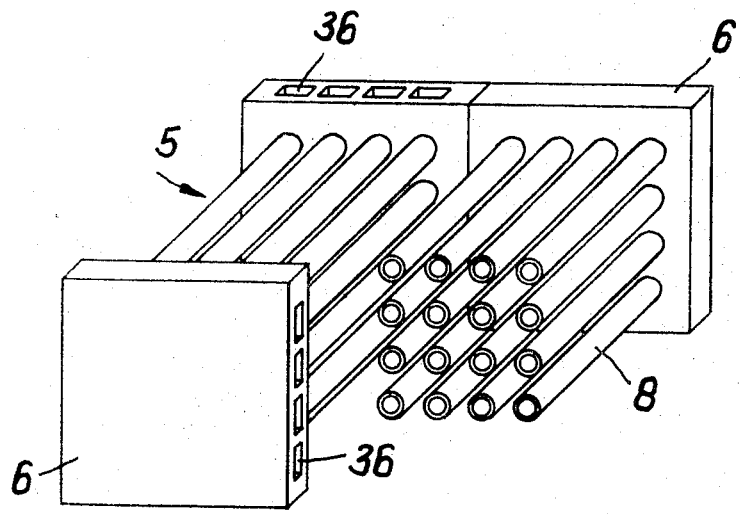

FIGS. 8a and 8f illustrate a further method for welding the tube ends to the tube connecting plates. According to this method, the tube connecting plates 6 are fused to the tubes 8 of synthetic material which form the nest of tube constructions 5. In principle, the nest of tube constructions 5 are together with the tube ends immersed into the bath 30 which contains a melt of synthetic material and which is received by the pan 29. This bath corresponds as to its dimensions to the later tube connecting plate. FIG. 8 shows that most simple method, according to which the tubes 8 with the solidified plate thereon. are moved out of the container. By milling off a certain layer at the bottom side, the melt which has entered the tubes is eliminated. According to FIG. 8b, the mandrels 31 are arranged in pan 29 in conformity with the number, the dimensions, and the distribution of the tubes 8. The nest of tubes construction 5 is, when immersing into the melt, slipped upone the mandrels 31. The tube ends remain free from the melt. The milling off of a layer from the solidified tube connecting plate 6 will not be necessary.

According to FIG. 8c, in pan 29 there are in addition to the mandrels 31 arranged half round fins 32 which are parallel to each other, said fins 32 being arranged at the bottom side. By means of the fins 32, when fusing the tubes 8 to the tube connecting plate 6, grooves 33 are formed in the plate 6 which by welding the plane plate 34 to the plate 6 are converted to complete deviating chambers (see FIG. 8d). According to the fusing method illustrated in FIG. 8e, the pan 29 has associated therewith vertically movable mandrels 31' and radially movable rod-shaped elements 35 which bring about that the tube connecting plates 6 formed by the solidified melt 30 comprise complete deviating clamps 36 as shown in FIG. 8f.

As will be evident from the above, the heat exchanger according to the present invention has a number of advantages. The employment of synthetic material is combined with saving in weight, with low manufacturing costs, with stability against corrosion, and low sensitivity relative to mechanical stresses in view of the natural elasticity of the synthetic material. The heat exchanger made of synthetic material is, by itself, noise absorbent and vibration damping so that the anchoring to special damping intermediate elements is not necessary. In contrast to heretofore known fin-equipped radiators, which in view of the slight distance between the fins can be cleaned only incompletely and at considerable costs, the cleaning of the radiators according to the invention is easily carried out. In view of the good elasticity and expandability of the synthetic material, there exists no danger that the heat exchanger will burst by the freezing of water. The matrix-like distribution of the tubes of synthetic material will, in addition to a large heat exchanging surface, assure a good accessibility while the construction itself is compact. A repair which will generally not be necessary can easily be carried out. Finally, with regard to the required modern trends, a heat exchanger made of synthetic material according to the invention has the advantage that it can easily be produced in different colors.

It is, of course, to be understood that the present invention is, by no means, limited to the particular showing in the drawings, but also comprises any modifications within the scope of the appended claims.

What we claim is:

1. A method of making a heat exchanger comprising a distributing container with a first tube connecting plate, a collecting container with a second tube connecting plate, and a nest of tubes interconnecting said tube connecting plates and thereby said containers, which includes the steps of: preparing two tube connecting plates of synthetic material with bores therethrough, preparing a nest of unheated tubes of synthetic material, heating the marginal areas of the bores in said tube connecting plates to welding temperature, slightly conically widening the bores in said tube connecting plates so that the bores of each tube connecting plate will taper toward the intended inside of the container pertaining to the respective tube connecting plate, inserting one end of the tubes of the nest of tubes, into the heated bores of one of said tube connecting plates and subsequently widening the said tube ends in conformity with the respective cone while welding the last mentioned tube ends to said last mentioned tube connecting plate, thereafter inserting the other end of said nest of tubes into the bores of the other tube connecting plate, and then widening the last mentioned tube ends in conformity with the cone of the bores of said last mentioned tube connecting plate while welding said last mentioned tube ends to said last mentioned tube connecting plate.

2. A method of making a heat exchanger comprising a distributing container with a first tube connecting plate, a collecting container with a second tube connecting plate, and a nest of tubes interconnecting said tube connecting plates and thereby said containers, which includes in combination the steps of: preparing a nest of unheated tubes of synthetic material, preparing two tube connecting plates of synthetic material with bores therethrough corresponding in diameter to the outer diameter of the tubes of the nest of tubes to be connected to said tube connecting plates, extending one end portion of the tubes of said nest of tubes through the bores of one tube connecting plate and the other end portion of the tubes of said nest of tubes through the other tube connecting plate so that said end portions protrude from those sides of said tube connecting plates which face away from each other, then heating the protruding tube portions and the marginal areas around the bores in said tube connecting plates to welding temperature, and subsequently folding said protruding end portions of said tubes over and welding them to said marginal areas around said bores.

References Cited

UNITED STATES PATENTS

| 2,824,212 | 2/1958 | Roberts | 165—178 X |
| 3,207,215 | 9/1965 | Whittell | 165—178 X |
| 3,537,935 | 11/1970 | Withers | 156—296 X |
| 3,448,804 | 6/1969 | Kreiselmaier | 165—178 X |
| 3,446,346 | 5/1969 | Burge | 156—296 X |

WILLIAM A. POWELL, Primary Examiner

U.S. Cl. X.R.

156—296, 305; 165—175, 178

UNITED STATES PATENT OFFICE
CERTIFICATE OF CORRECTION

Patent No. 3,841,938    Dated October 15, 1974

Inventor(s) Werner Grosse-Holling et al.

It is certified that error appears in the above-identified patent and that said Letters Patent are hereby corrected as shown below:

The name of the assignee should read -- Fried. Krupp Gesellschaft mit beschrankter Haftung, Essen, Germany --.

Signed and sealed this 11th day of February 1975.

(SEAL)
Attest:

RUTH C. MASON
Attesting Officer

C. MARSHALL DANN
Commissioner of Patents
and Trademarks